(12) United States Patent
McGranahan et al.

(10) Patent No.: US 7,826,705 B2
(45) Date of Patent: Nov. 2, 2010

(54) PARKING DEVICE FOR FIBER DISTRIBUTION HUB

(75) Inventors: Danny McGranahan, Ft. Worth, TX (US); William J. M. Giraud, Springtown, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/499,572

(22) Filed: Aug. 4, 2006

(65) Prior Publication Data

US 2007/0033629 A1   Feb. 8, 2007

Related U.S. Application Data

(60) Provisional application No. 60/706,058, filed on Aug. 5, 2005.

(51) Int. Cl.
*G02B 6/00* (2006.01)
*H04N 7/173* (2006.01)

(52) U.S. Cl. ................... 385/135; 385/137; 725/119; 725/129

(58) Field of Classification Search ............. 385/135, 385/137; 725/119, 129
See application file for complete search history.

(56) References Cited

U.S. PATENT DOCUMENTS

| | | | |
|---|---|---|---|
| 6,983,095 B2 | 1/2006 | Reagan et al. | 385/135 |
| 7,200,317 B2* | 4/2007 | Reagan et al. | 385/139 |
| 2004/0109660 A1* | 6/2004 | Liberty | 385/135 |
| 2005/0281526 A1 | 12/2005 | Vongseng et al. | 385/135 |

* cited by examiner

*Primary Examiner*—Charlie Peng
*Assistant Examiner*—Jerry Blevins
(74) *Attorney, Agent, or Firm*—John H. Vynalek

(57) ABSTRACT

There is provided a fiber distribution hub with a panel assembly that includes one or more selectively removable parking devices. The parking devices are adapted to selectively receive one or more connectors of fiber optic cables within the fiber distribution hub. The panel assembly includes a parking area that defines a plurality of slots into which the parking devices are inserted. Once a parking device has been removed from the slot, a splitter module can be inserted into the slot previously occupied by the parking device. Therefore, the size of the housing of the fiber distribution hub can be reduced because the parking area can also be used for splitter mounting.

19 Claims, 4 Drawing Sheets

PARKING DEVICE FOR FIBER DISTRIBUTION HUB

CROSS REFERENCE TO RELATED APPLICATION

The present application claims priority pursuant to 35 U.S.C. 119(e) to U.S. Provisional Application Ser. No. 60/706,058, filed Aug. 5, 2005.

BACKGROUND OF THE INVENTION

1. Field of the Invention

The present invention is related to fiber distribution hubs in fiber optic networks, and more particularly, to parking devices and splitter modules of fiber distribution hubs.

2. Description of Related Art

Fiber distribution hubs are often used in fiber-to-the-premises networks to connect feeder cables to distribution cables through one or more splitter modules that optically connect one single fiber of the feeder cable to eight, sixteen, or thirty-two fibers of the distribution cable, to provide a non-limiting description of the uses for fiber distribution hubs and/or splitter modules. As fiber distribution hubs are commonly installed above ground and can occupy a significant amount of volume, it is desirable to minimize the size of the fiber distribution hubs for reasons of cost, ease of installation, aesthetics, and the like.

In addition, many fiber distribution hubs include empty storage areas which are adapted for the future installation of one or more additional splitter modules, which are often added as more subscribers, whose service would be routed through the fiber distribution hub, request service. This storage space adds volume to the fiber distribution hub. Furthermore, fiber distribution hubs often include one or more parking devices to selectively store connectorized fiber optic cables that output from a splitter module but, for example, are not yet connected to a subscriber termination in a distribution field of the fiber distribution hub. These parking devices provide convenient retention of the optic fiber cables; however, the parking devices do add to the volume of the fiber distribution hub.

As disclosed in U.S. Patent Application Publication No. 2005/0281526, the disclosure of which is incorporated by reference herein, one fiber distribution hub includes a splitter mounting area in an upper portion of the fiber distribution hub and a bulkhead in a lower portion of the fiber distribution hub. The bulkhead is adapted to receive removable connector holders or parking devices. The fiber distribution hub also includes one or more splitter modules that include a number of fiber optic cables preconnected to a parking device. When an additional splitter module is installed in the fiber distribution hub in the splitter mounting area, the corresponding parking device is installed in the bulkhead by removing an empty parking device. Therefore, the technician is not required to install each of the individual fiber optic cables into a parking device. However, such a fiber distribution hub requires a certain amount of volume to provide the splitter mounting area and the bulkhead, along with a cable storage area located proximately therebetween.

Therefore, a need exists for a fiber distribution hub that is configured to allow installation of additional splitter modules while requiring less interior volume than conventional fiber distribution hubs.

BRIEF SUMMARY OF THE INVENTION

The invention addresses the above needs and achieves other advantages by providing a fiber distribution hub that requires relatively less interior volume than conventional fiber distribution hubs by permitting splitter modules to be installed directly in the parking area of the fiber distribution hub. More specifically, a technician may remove a parking device, preferably a parking device that is empty of connectors of fiber optic cables, to provide a slot in the parking area into which the technician may then install a splitter module. Therefore, some embodiments of the present invention effectively eliminate the splitter mounting area of prior art fiber distribution hubs and accordingly allow the fiber distribution hub of the present invention to require less interior volume.

The fiber distribution hub of various embodiments of the present invention comprises a housing in which one or more fiber optic cables with connectors are housed. A parking area is provided within the housing, and the parking area defines a plurality of slots, such as vertical slots in some embodiments of the present invention. At least one parking device is selectively inserted into a slot of the parking area and at least one splitter module is selectively inserted into a slot of the parking area, such that the slots of the parking area are adapted to receive either a parking device or a splitter module. Further embodiments of the present invention also comprise parking devices and/or splitter modules that are permanently installed within the housing of the fiber distribution hub.

The present invention also includes methods for installing a splitter module into a fiber distribution hub. The housing of the fiber distribution hub is opened and at least one parking device is removed from an individual slot of a plurality of slots in a parking area of the housing. The splitter module is inserted into the individual slot from which the parking device was removed. Therefore, the present invention includes various apparatuses and methods for providing connector parking and installing splitter modules in a fiber distribution hub.

BRIEF DESCRIPTION OF THE SEVERAL VIEWS OF THE DRAWINGS

Figure 1:
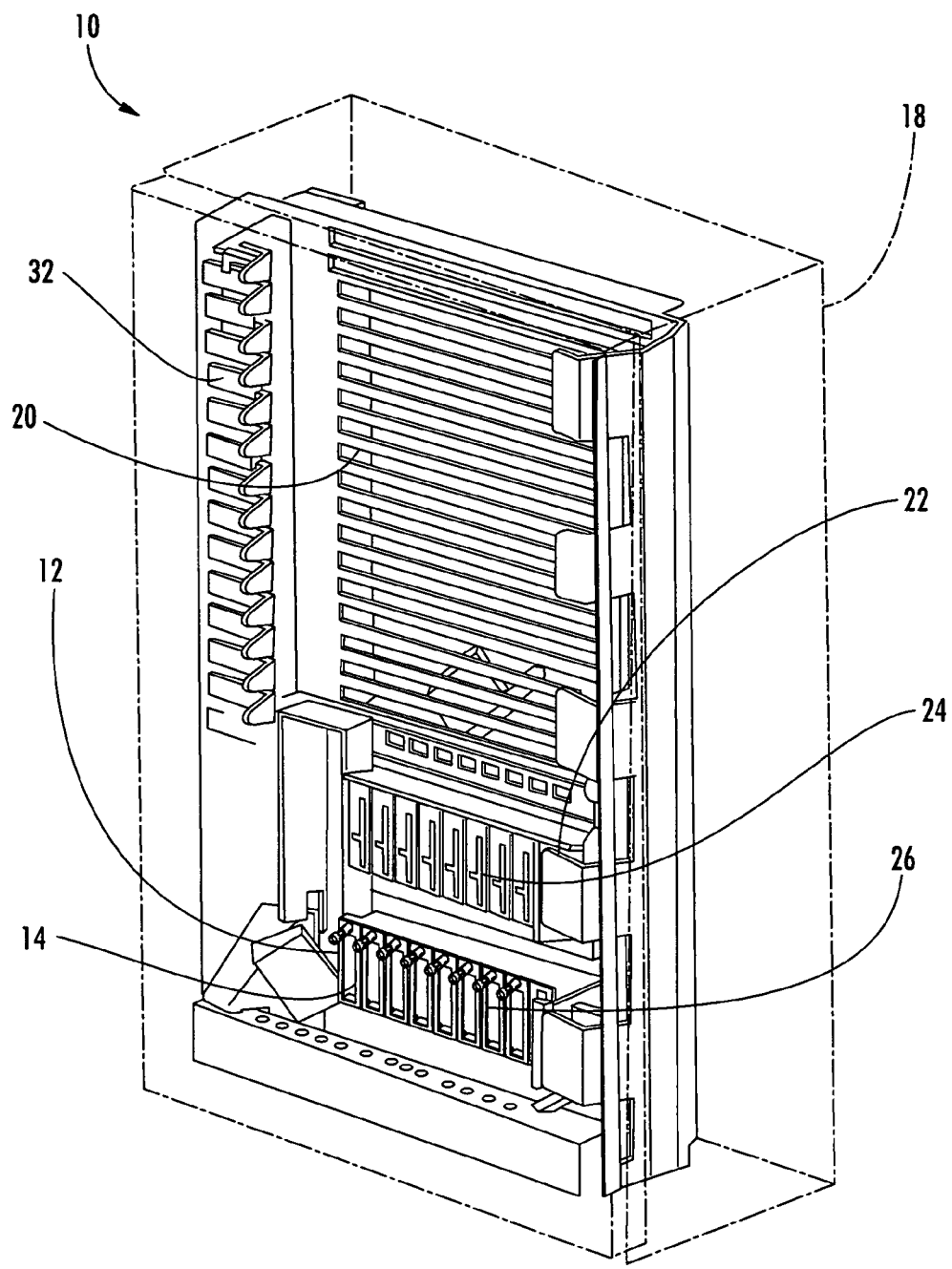
Figure 2:
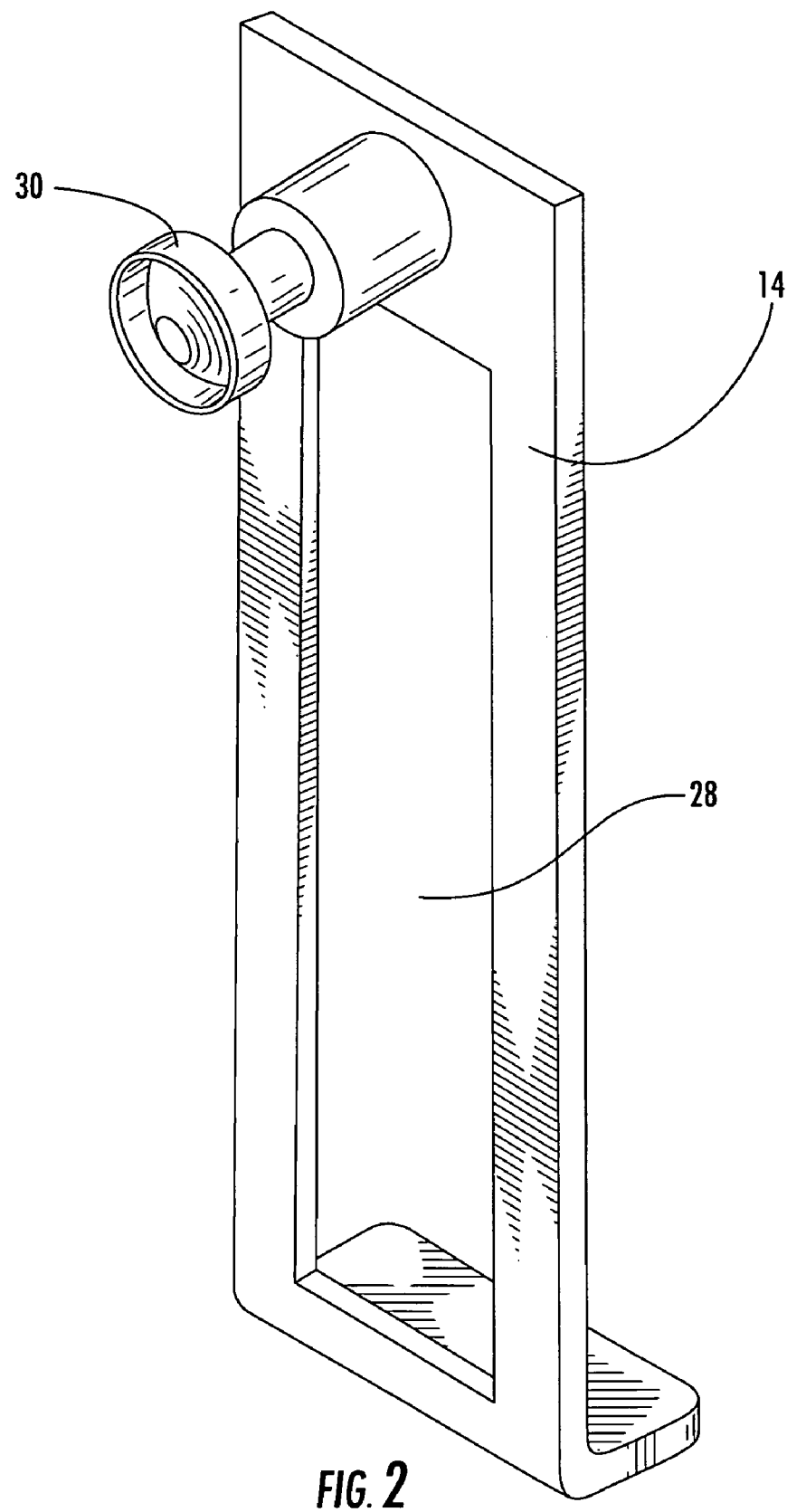
Figure 3:
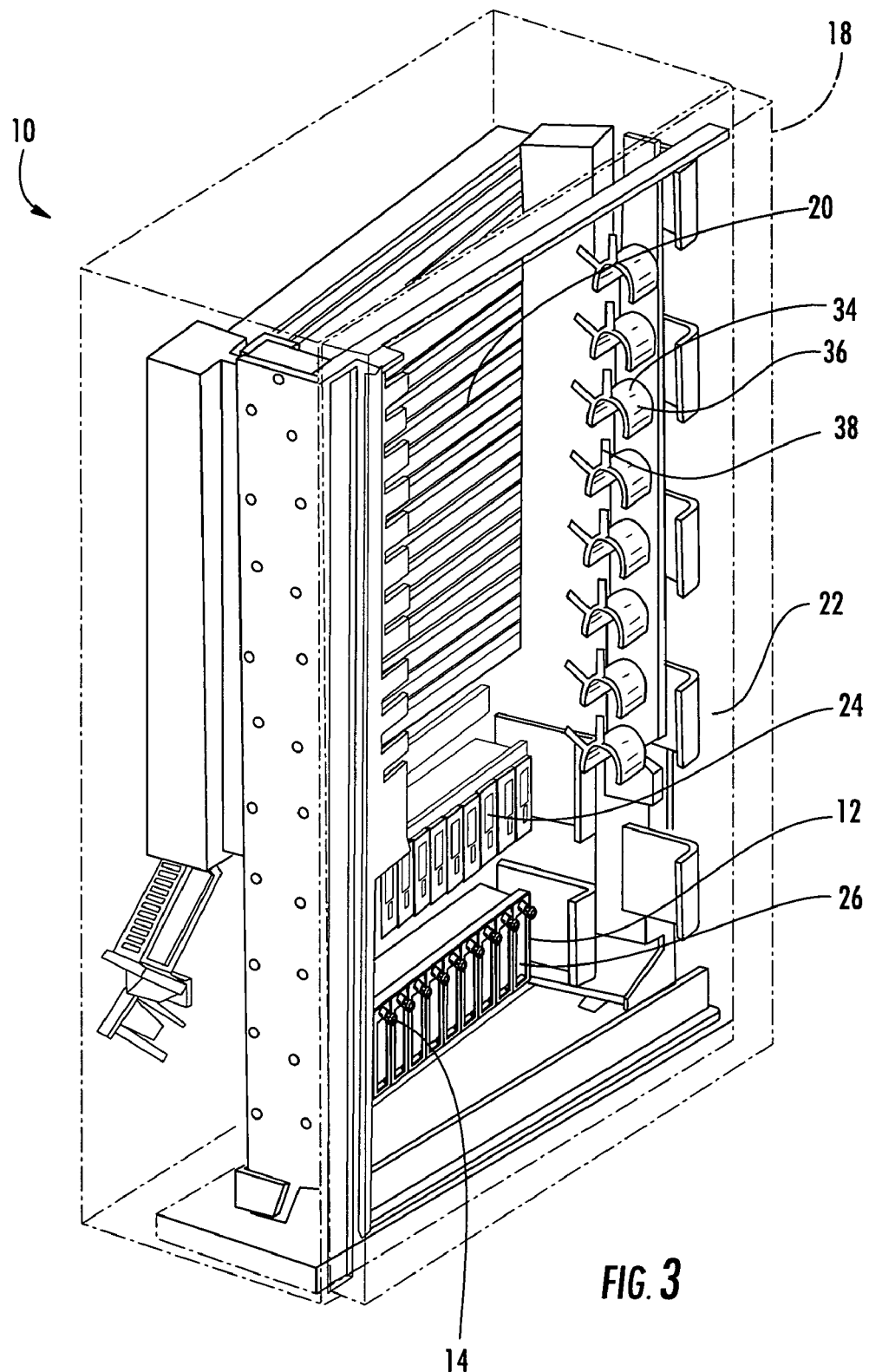
Figure 4:
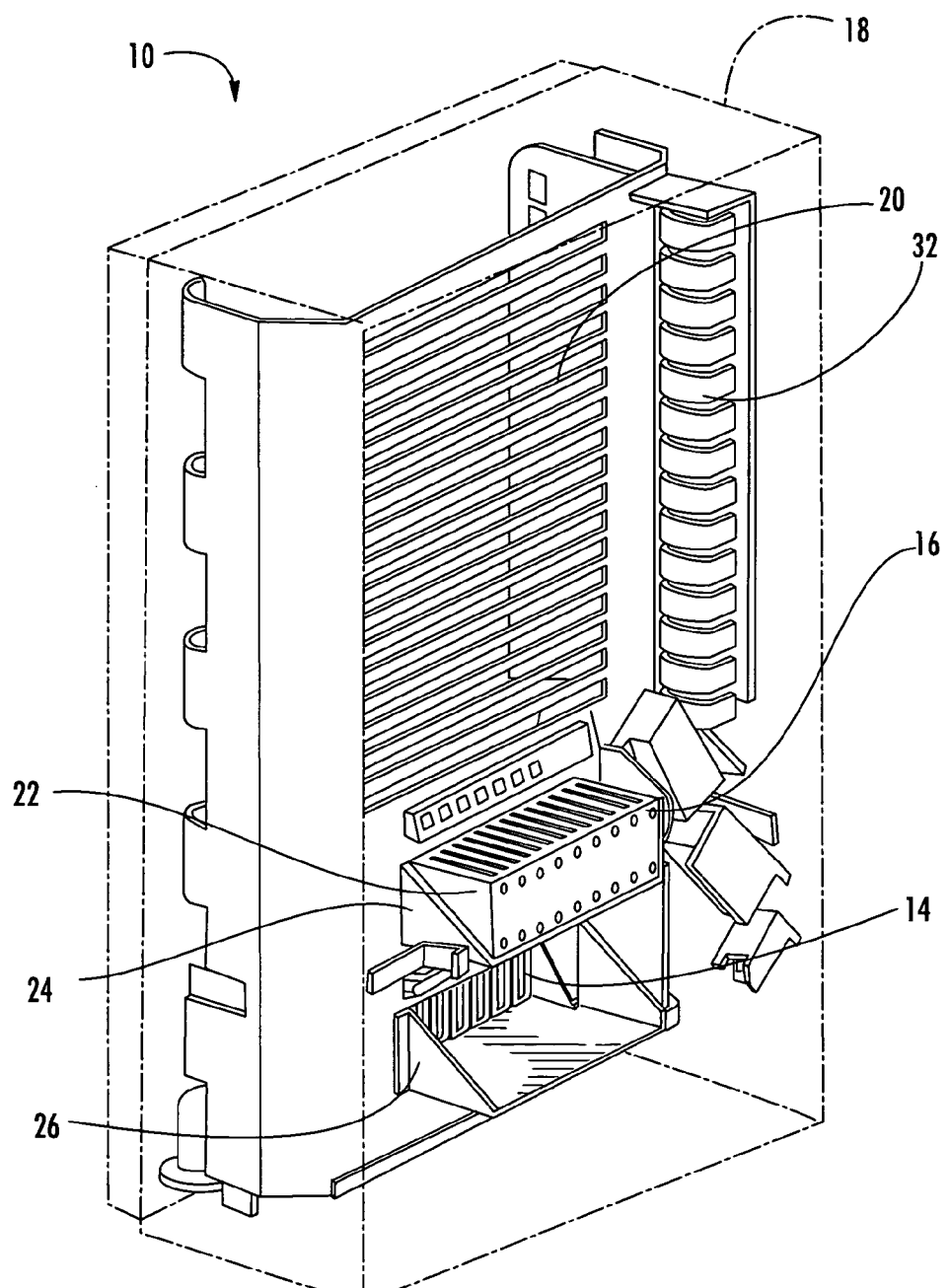

Having thus described the invention in general terms, reference will now be made to the accompanying drawings, which are not necessarily drawn to scale and are meant to be illustrative and not limiting, and wherein:

FIG. 1 is a perspective view of a fiber distribution hub in accordance with a first embodiment of the present invention, illustrating the front and right sides of the fiber distribution hub;

FIG. 2 is an enlarged perspective view of the parking device of FIG. 1, illustrating the vertical slot and plunger-type fastener;

FIG. 3 is a perspective view of the fiber distribution hub of FIG. 1, illustrating the front and left sides of the fiber distribution hub and illustrating the fiber slack hangers generally located in the right side of the fiber distribution hub; and FIG. 4 is a perspective view of the fiber distribution hub of FIG. 1, illustrating the back and right sides of the fiber distribution hub.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for installing splitter modules are described and shown in the accompanying drawings with regard to a specific type of fiber distribution hub, it is envisioned that the functionality of the various apparatus and methods may be applied to any now known or hereafter devised fiber distribution hubs in which it is desired to install splitter modules and/or provide parking devices. Like numbers refer to like elements throughout.

With reference to FIGS. 1-4, a fiber distribution hub 10 in accordance with one embodiment of the present invention is illustrated. The fiber distribution hub 10 of the illustrated embodiment includes a panel assembly 12 configured for receiving parking devices 14 and splitter modules 16. The fiber distribution hub 10 of the illustrated embodiment is intended for use at a local convergence point in which a portion of a feeder cable is optically connected to one or more splitter modules, which optically connects the feeder cable to a plurality of pigtails. The pigtails are selectively connected by adapters in a distribution field to one or more distribution cables that exit the fiber distribution hub and that are routed to one or more network access points. However, further embodiments of the present invention comprise fiber distribution hubs at alternative locations in the fiber optic network.

The fiber distribution hub 10 of FIGS. 1, 3, and 4 comprises a panel assembly 12 that is shown as being in a lower portion of the housing 18 of the fiber distribution hub; however, further embodiments of the present invention include the panel assembly in any location within the housing of the fiber distribution hub. The fiber distribution hub of the present invention may comprise a housing of any shape, may be above grade or below grade, and may be intended for outdoor use and/or indoor use. The panel assembly of the present invention may be used in any fiber distribution hub, cabinet, or any other device used in a fiber optic network.

The fiber distribution hub 10 of FIG. 1 comprises a housing 18 that generally defines a rectangular shape and defines an interior volume. The interior volume of the housing 18 is accessible through at least one door on the front side of the housing; however, fiber distribution hubs of the present invention comprise housings that may be accessible through any side or through devices other than a door. Inside the fiber distribution hub 10 of FIG. 1 is a distribution field 20 that comprises a plurality of adapters for selectively receiving a plurality of connectors of the fiber optic cables and a plurality of connectorized ends of distribution cables (not shown) that exit the distribution field. The distribution field 20 allows a technician to selectively determine which distribution cables are optically connected to the pigtails that exit the splitter modules.

The fiber distribution hub 10 of FIG. 1 also comprises a plurality of splitter modules 22 mounted in a splitter mounting area 24. Whereas the splitter mounting area 24 is directly above the parking area 26 of the panel assembly 12, further embodiments of the present invention may provide a single area for splitter mounting and parking or may locate a splitter mounting area and a parking area in any relative location. The fiber distribution hub of the present invention may further have at least one splitter module that is permanently installed within the housing and/or at least one parking device that is permanently installed within the housing. Referring again to the splitter modules 22 of FIG. 1, the connectorized pigtails (not shown) exiting the splitter modules may be inserted into the adapters of the distribution field 20, may be suspended from fiber slack hangers, and/or may be received by a parking device 14. However, as increasing numbers of pigtails are connected into the adapters of the distribution field 20, increasing numbers of parking devices 14 will become empty of connectors of the pigtails. Therefore, the present invention provides the ability to install additional splitter modules in the panel assembly 12 in the slots where the emptied parking devices 14 were located.

Turning now to the panel assembly 12 of FIGS. 1, 3, and 4, the panel assembly includes a parking area 26 that defines a plurality of slots, such as a plurality of slots that are generally vertically oriented. The parking area 26 further defines a plurality of fastening portions for selective engagement with a fastener of the parking devices 14 for selective insertion and retention of the parking devices. The panel assembly 12 of the illustrated embodiment comprises a parking area that is generally accessible from the front of the housing 18 of the fiber distribution hub 10, such that the parking devices 14 are removable from a front side of the housing. However, further embodiments of the present invention may locate the panel assembly at any location and orientation such that the parking devices may be removed from any direction relative to the housing of the fiber distribution hub.

The parking device 14 is shown in more detail in FIG. 2. The parking device 14 defines an elongated opening 28 oriented in a generally vertical direction to receive the one or more connectors of the fiber optic cables within the fiber distribution hub, such as the pigtails extending from the splitter modules 22. The parking device 14 is adapted to receive at least six connectors such that the connectors contact the adjacent connector selectively inserted into the parking device. Further embodiments of the present invention comprise alternative parking devices that define an opening of any shape in any orientation and sized to receive any number of connectors that may or may not contact the adjacent connector.

The parking devices 14 of FIGS. 1-4 are adapted to be selectively inserted into an individual slot of the plurality of slots of the parking area 26. The parking device 14 includes a fastener device 30, such as the plunger-type fastener illustrated in FIG. 2 to provide one non-limiting example, that provides for convenient insertion and/or removal of the parking device. Further embodiments of the present invention provide alternative fastener devices, such as tabs, clamps, or the like to list non-limiting examples, or no fastener device whatsoever, for selectively retaining the parking device relative to the parking area. Turning again to the parking device 14 of FIG. 2, the fastener device 30 is generally located vertically above the elongated opening 28; however, the fastener device may be located anywhere on the parking device. Opposite the fastener device 30 is provided a tab portion that is generally orthogonal to the portion of the parking device that defines the elongated opening 28, such that the tab portion provides additional structural strength and/or retention with the parking area 26. Still further embodiments of the present invention provide parking devices of alternative shape and structure.

The fiber distribution hub 10 also includes a number of fiber slack hangers 32, 34 about which fiber optic cables may be routed. More particularly, the fiber slack hanger 34 comprises a plurality of individual hangers 36 spaced apart from one another and joined to an elongated portion. The individual hangers 36 also define cable retainers 38 located generally opposite the elongated portion of the fiber slack hanger 34. The individual hangers 36 of FIGS. 1, 3, and 4 are positioned to a side of the housing of the fiber distribution hub and define an axis that is generally orthogonal to the sides of the housing. Prior art fiber slack hangers comprise individual hangers that define axes that are generally orthogonal to the front and/or back of the housing of the fiber distribution hub; however, the present invention has provided individual hangers 36 that are orthogonal to conventional fiber slack hangers such that the interior volume of the fiber distribution hub may be reduced relative to prior art fiber distribution hubs. Further embodiments of the present invention provide fiber slack hangers located in alternative positions and oriented in alternative directions.

In addition, the present invention provides methods for installing a splitter module 22 into the housing 18 of a fiber distribution hub 10. The technician opens the housing 18 of the fiber distribution hub 10 and identifies a parking device 14 that retains no connectors of fiber optic cables or moves the connectors from a parking device to a different parking device or to the distribution field. The technician then removes the empty parking device 14, preferably by manipulating the fastener device 30, such as by pulling the plunger-type fastener shown in FIG. 2 to provide one non-limiting example, from the parking area 12 to expose an individual slot. The technician subsequently inserts the splitter module into the individual slot of the parking area 12 from which the parking device 14 was removed, and preferably fastens the splitter module to the parking area with a fastener device or the like. Once the splitter module has been selectively inserted into the parking area and preferably optically connected to the feeder cable entering the housing of the fiber distribution hub, the one or more pigtails extending from the splitter module may be routed by the technician, preferably about the fiber slack hangers, and connected to adapters of the distribution field, connected to one or more remaining parking devices, or suspended from the fiber slack hangers. Therefore, the present invention provides for convenient parking of connectors and convenient installation of splitter modules while reducing the volume required within the interior of the housing of the fiber distribution hub.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A fiber distribution hub in a fiber optic network, the fiber distribution hub comprising:
    a housing;
    at least one fiber optic cable within the housing, wherein the at least one fiber optic cable comprises at least one connector on an end of the fiber optic cable;
    a distribution field comprising a plurality of adapters for selectively receiving a plurality of connectors of the at least one fiber optic cable and a plurality of connectorized ends of distribution cables;
    a parking area within the housing, wherein the parking area defines a plurality of slots, and wherein the parking area is adapted to selectively receive one or more connectors of the at least one fiber optic cable;
    at least one parking device selectively inserted into an individual slot of the plurality of slots, wherein the at least one parking device is adapted to selectively receive one or more connectors of the at least one fiber optic cable; and
    at least one splitter module selectively inserted into an individual slot of the plurality of slots in the parking area,
    wherein the plurality of slots in the parking area are adapted to alternatively receive the at least one parking device and the at least one splitter module.

2. A fiber distribution hub according to claim 1, further comprising at least one parking device permanently installed within the housing.

3. A fiber distribution hub according to claim 1, further comprising at least one splitter module permanently installed within the housing.

4. A fiber distribution hub according to claim 1, wherein the at least one parking device comprises a plunger-type fastener for selectively retaining the at least one parking device to the parking area.

5. A fiber distribution hub according to claim 1, wherein the at least one parking device defines an elongated opening to receive the one or more connectors of the at least one fiber optic cable.

6. A fiber distribution hub according to claim 5, wherein the at least one parking device is adapted to receive two or more connectors of two or more fiber optic cables, such that the two or more connectors contact one another while received within the at least one parking device.

7. A fiber distribution hub according to claim 1, wherein the at least one parking device is adapted to receive at least six connectors of at least six fiber optic cables.

8. A fiber distribution hub according to claim 1, wherein the plurality of slots of the parking area are generally vertically oriented.

9. A fiber distribution hub according to claim 1, further comprising slack hangers.

10. The fiber distribution hub of claim 9, wherein the housing has a front and a back, right side, and a left side, and wherein the slack hangers are orthogonal generally to the right side and the left side of the housing.

11. A fiber distribution hub according to claim 1, wherein the at least one parking device is removable from a front side of the housing.

12. The fiber distribution hub of claim 1, wherein the at least one splitter module selectively inserted into an individual slot of the plurality of slots in the parking area includes a plurality of pigtails, and wherein the at least one fiber optic cable is one of the plurality of pigtails, and wherein the one of the plurality of pigtails is routed from the parking area to the distribution field.

13. A panel assembly for a fiber distribution hub in a fiber optic network, wherein the fiber distribution hub houses at least one fiber optic cable including at least one connector on an end of the fiber optic cable and wherein the fiber distribution hub houses at least one splitter module, the panel assembly comprising:
    a parking area defining a plurality of slots; and at least one parking device selectively inserted into an individual slot of the plurality of slots, wherein the at least one parking device is adapted to selectively receive one or more connectors of the at least one fiber optic cable, wherein the plurality of slots are adapted to alternatively receive the at least one parking device and the at least one splitter module.

14. A panel assembly according to claim 13, wherein the at least one parking device comprises a plunger-type fastener for selectively retaining the at least one parking device to the parking area.

15. A panel assembly according to claim 13, wherein the at least one parking device defines an elongated opening to receive the one or more connectors of the at least one fiber optic cable.

16. A panel assembly according to claim 13, wherein the at least one parking device is adapted to receive two or more connectors of two or more fiber optic cables, such that the two or more connectors contact one another while received within the at least one parking device.

17. A panel assembly according to claim 13, wherein the at least one parking device is adapted to receive at least six connectors of at least six fiber optic cables.

18. A panel assembly according to claim 13, wherein the plurality of slots of the parking area are generally vertically oriented.

19. The panel assembly of claim 13, wherein the at least one splitter module selectively inserted into an individual slot of the plurality of slots in the parking area includes a plurality of pigtails, and wherein the plurality of pigtails route from the parking area to a distribution field housed in the fiber distribution hub.

* * * * *